(12) United States Patent
Lobsenz

(10) Patent No.: US 8,874,782 B2
(45) Date of Patent: Oct. 28, 2014

(54) CONFIGURABLE DOWNLOAD TIMING AND REWARD SYSTEM IN A DATA NETWORK

(75) Inventor: Charles B. Lobsenz, Reston, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 0 days.

(21) Appl. No.: 13/444,291

(22) Filed: Apr. 11, 2012

(65) Prior Publication Data

US 2012/0203616 A1 Aug. 9, 2012

Related U.S. Application Data

(63) Continuation of application No. 12/549,024, filed on Aug. 27, 2009, now Pat. No. 8,176,198.

(51) Int. Cl.
| | |
|---|---|
| G06F 15/16 | (2006.01) |
| H04L 12/26 | (2006.01) |
| H04L 12/911 | (2013.01) |
| H04L 29/08 | (2006.01) |
| G06Q 10/06 | (2012.01) |
| G06Q 30/06 | (2012.01) |
| H04W 28/02 | (2009.01) |

(52) U.S. Cl.
CPC .............. *H04L 67/06* (2013.01); *H04L 47/748* (2013.01); *H04L 67/306* (2013.01); *G06Q 10/06* (2013.01); *H04L 67/02* (2013.01); *H04W 28/0289* (2013.01); *H04L 67/325* (2013.01); *G06Q 30/06* (2013.01)
USPC ............ 709/235; 709/219; 709/226; 370/229

(58) Field of Classification Search
CPC ....... H04L 47/10–47/41; H04L 47/70–47/823; H04L 67/32–67/327; H04W 28/0231–28/0247; H04W 28/0289
USPC ................. 709/232–235, 217–219, 223–226; 705/14.1–14.39; 370/229–234
See application file for complete search history.

(56) References Cited

U.S. PATENT DOCUMENTS

| | | | |
|---|---|---|---|
| 6,556,548 B1 * | 4/2003 | Kirkby et al. ................. | 370/322 |
| 7,076,237 B2 | 7/2006 | Dawson et al. | |
| 7,526,788 B2 | 4/2009 | Rodriguez | |
| 8,006,262 B2 | 8/2011 | Rodriguez et al. | |
| 8,176,198 B2 | 5/2012 | Lobsenz ....................... | 709/234 |
| 8,380,593 B1 * | 2/2013 | Patro et al. ...................... | 705/34 |
| 2002/0069241 A1 | 6/2002 | Narlikar et al. | |
| 2002/0116266 A1 * | 8/2002 | Marshall ......................... | 705/14 |
| 2002/0118806 A1 * | 8/2002 | Walker et al. ............. | 379/114.01 |
| 2002/0123330 A1 * | 9/2002 | Yen ............................... | 455/414 |
| 2002/0143952 A1 * | 10/2002 | Sugiarto et al. ............... | 709/227 |
| 2003/0002862 A1 * | 1/2003 | Rodriguez et al. ............ | 386/125 |
| 2003/0005452 A1 * | 1/2003 | Rodriguez ...................... | 725/86 |
| 2003/0005453 A1 * | 1/2003 | Rodriguez et al. .............. | 725/87 |
| 2003/0005454 A1 * | 1/2003 | Rodriguez et al. .............. | 725/89 |
| 2003/0145098 A1 * | 7/2003 | Litwin .......................... | 709/232 |
| 2004/0010592 A1 * | 1/2004 | Carver et al. .................. | 709/226 |
| 2004/0013089 A1 * | 1/2004 | Taneja et al. .................. | 370/235 |
| 2004/0215806 A1 * | 10/2004 | Brenner et al. ............... | 709/232 |
| 2006/0030291 A1 * | 2/2006 | Dawson et al. ............... | 455/405 |

(Continued)

*Primary Examiner* — Patrice Winder
*Assistant Examiner* — Julian Chang

(57) ABSTRACT

A system and method are provided for determining whether a transaction between a subscriber and a merchant website requires downloading and/or streaming digital objects. In response to a determination that the transaction does require downloading and/or streaming of digital objects, a subscriber is provided with various options for delaying such downloading and/or streaming in return for incentives of varying value.

20 Claims, 3 Drawing Sheets

(56) References Cited

U.S. PATENT DOCUMENTS

| | | | |
|---|---|---|---|
| 2006/0040641 A1* | 2/2006 | Dawson et al. | 455/405 |
| 2006/0056324 A1* | 3/2006 | Hyyppa et al. | 370/310 |
| 2006/0172721 A1* | 8/2006 | Dawson et al. | 455/405 |
| 2006/0246878 A1 | 11/2006 | Khoury | |
| 2007/0174412 A1 | 7/2007 | Araki | |
| 2007/0287414 A1* | 12/2007 | Dawson et al. | 455/405 |
| 2008/0037554 A1* | 2/2008 | Vincent et al. | 370/395.42 |
| 2008/0192820 A1 | 8/2008 | Brooks et al. | |
| 2008/0207164 A1* | 8/2008 | Dawson et al. | 455/406 |
| 2008/0263632 A1* | 10/2008 | Keon | 726/3 |
| 2008/0281968 A1* | 11/2008 | Rodriguez | 709/226 |
| 2008/0311885 A1* | 12/2008 | Dawson et al. | 455/406 |
| 2009/0088188 A1 | 4/2009 | Wormald et al. | |
| 2009/0144361 A1 | 6/2009 | Nobakht et al. | |
| 2009/0183081 A1 | 7/2009 | Rodriguez et al. | |
| 2010/0070628 A1* | 3/2010 | Harrang et al. | 709/224 |
| 2011/0055413 A1 | 3/2011 | Lobsenz | |

* cited by examiner

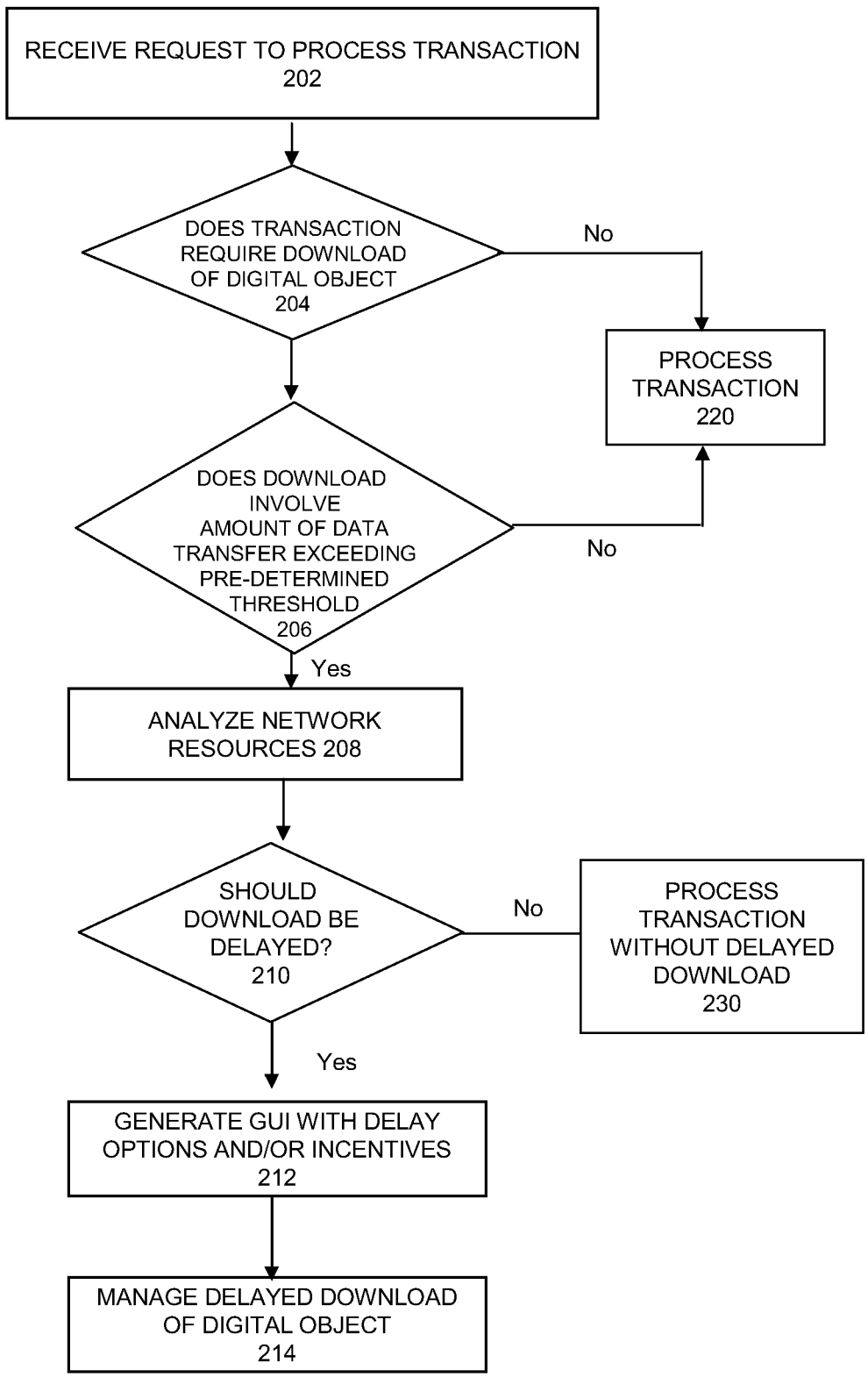

| POP-UP WINDOW 320 |||
|---|---|---|
| TITLE OF DIGITAL OBJECT | INCENTIVE TYPE ||
| | CHOOSE ▽ ||
| | LOYALTY POINTS ||
| DESCRIPTION/PICTURE OF DIGITAL OBJECT | • MONETARY COMPENSATION ||
| | • INSTANT BUY CREDIT ||
| | ⋮ ||
| DELAY OPTIONS 310 | INCENTIVES 315 ||
| 1) NEXT AVAILABLE DOWNLOAD TIME – 10:00 PM | 20 loyalty points ||
| 2) NEXT AVAILABLE DOWNLOAD TIME-PERIOD 12:00 AM – 3:00 AM | 50 loyalty points ||
| 3) DELAY YOU ARE WILLING TO ACCEPT | 50 loyalty points ||
| 1 hr. ▽ | ||
| 2 hrs | ||
| 3 hrs. | ||
| 4 hrs. | ||
| ⋮ | ||
| 4) SELECT TIME PERIOD FOR DOWNLOAD | 100 loyalty points ||
| 12:00 AM – 3:00 AM ▽ | ||
| 1:00 AM – 4:00 AM | ||
| 2:00 AM – 5:00 AM | ||
| ⋮ | ||

CONFIGURABLE DOWNLOAD TIMING AND REWARD SYSTEM IN A DATA NETWORK

CROSS-REFERENCE TO RELATED APPLICATIONS

This application claims benefit under 35 USC §120 as a continuation application of co-pending application Ser. No. 12/549,024 filed on 27 Aug. 2009, the entire contents of which are incorporated herein by reference.

BACKGROUND

This disclosure relates to a system and method for offering a subscriber an option to delay the downloading and/or streaming of digital objects in return for an incentive.

Given the ever increasing amount of network traffic resulting from applications and content which use/comprise of huge amounts of data, network congestion has been and will likely be an even more vexing problem that network operators will have to deal with. Particularly, for 4G networks where users will expect high download and upload speeds and seek to interact with applications and content that require transmission of large amounts of data across the network, efficient allocation of network resources by network operators will be an important component with a direct effect on the user experience.

SUMMARY

One aspect of this disclosure relates to a system and method for determining whether a transaction between a subscriber (or other user) and a merchant website requires downloading and/or streaming of digital objects and, in response to a determination that the transaction does require downloading and/or streaming of digital objects, offering the subscriber an option to delay such downloading and/or streaming in return for an incentive. In return for agreeing to a delay, the subscriber may be provided an incentive such as, for example, a reward, service credit, loyalty points associated with loyalty programs, monetary compensation, credits on bills, and/or other incentives. In one aspect, the incentive may include an instant buy credit to incent additional purchases. Delay options associated with the delayed downloading and/or streaming of the digital objects and the incentives associated therewith may be selectable by the subscriber (e.g. via a user interface). The implementation of the delay may be accomplished via the website operator or in some implementations, a network operator acting on behalf of the website operator.

A network operator may comprise an organization that provides carrier services (network services) to one or more subscribers (e.g., wired, wireless or other subscribers). In an implementation, the network operator may be a telephone company, a wireless service provider, an Internet service provider (ISP), and/or other network operator. The one or more subscribers may connect to the merchant website to perform the transaction (via the services provided by the network operator or otherwise).

According to an aspect of this disclosure, the transaction may comprise a transaction associated with the purchase of products and/or services from the merchant site including (and/or requiring) downloading/streaming of digital objects. Digital objects may comprise information that is requested/initiated by a subscriber, information that is pushed to a subscriber, information that transfers from machine to machine, and/or other information. Digital objects may include media content, for example, videos, movies, books, programs, music, and/or other media content; data; digital files; and/or any other digital objects which may involve substantial bandwidth. According to an aspect of this disclosure, digital objects may include electronic reports, spreadsheets, graphs and/or other digital objects that may be provided as results associated with the service purchased by the subscriber.

According to an aspect of this disclosure, the system may comprise one or more components such as, for example, one or more subscriber devices, a network operator system, and a merchant website operator system in operative communication with the network operator system. One or more subscribers may use the subscriber devices to connect to the network operator system and/or merchant website operator system. The merchant website operator system may be configured to host and/or operate the merchant website. The one or more subscriber devices may connect to the network operator system and/or the merchant website operator system via a first communication link. The first communication link may include radio, wireless, IP, and/or other links. The merchant website operator system may be in operative communication with the network operator system via a second communication link. The second communication link may be a dedicated link such as, for example, a T1 line, and/or other dedicated link. In one implementation, the second communication link may have a different data flow rate (e.g., higher) than the first communication link.

According to an aspect of this disclosure, the network operator system may comprise computer hardware programmed with a computer application having various software modules including a subscriber registration module, a download management module, and/or other modules as described herein. The network operator system may include or have access to a database that comprises a subscriber profile database, a merchant information database, a digital object store, and/or other databases.

According to an aspect of this disclosure, the subscriber registration module may manage the registration and/or access of the one or more subscribers and/or subscriber devices with/to the network operator system. The subscribers may register with the network operator system by providing login/password information, personal information, subscriber device information, option information for delayed download/streaming, acceptable rewards, subscriber preferences, and/or other information. Profiles may be created for the subscribers based on the provided information, and subscriber registration module may direct storage of the created subscriber profiles in the subscriber profile database.

According to an aspect of this disclosure, the download management module may receive, from the merchant website operator system, delayed download/delivery instructions for digital objects and/or services purchased by subscribers, authorization of payment for the digital objects and/or services, and/or other merchant information. The download management module may direct storage of the merchant information in the merchant information database.

The download management module may also receive, from the merchant website operator system, electronic copies of the purchased digital objects to be delivered to the subscriber devices based on the delayed download/delivery instructions. The download management module may direct storage of the electronic copies in the digital object store.

According to an aspect of this disclosure, the merchant website operator system may comprise computer hardware programmed with a computer application with various software modules including a transaction processing module, a download/delivery manager, and/or other modules as described herein.

When a purchased product/service includes a download of a digital object, a transaction processing module at the merchant website operator system may automatically download the digital object to the subscriber device in response to payment authorization for the product/service.

In various instances, download of a digital object may involve a large amount of data transfer and the network resources associated with the network operator system and/or the merchant website operator system may be too congested and/or overloaded to handle the download. In these instances, it may be beneficial to delay the download of the digital object to a later date/time to ensure efficient allocation of network resources by the network operator system and/or merchant website operator system. In addition, a subscriber may also be willing to accept a delay in the download of the digital object to his or her subscriber device.

According to an aspect of this disclosure, the transaction processing module at the merchant website operator system may perform purposefully delayed download processing operations (e.g., in addition to any inherent delays). The transaction processing module may, based on a determination of an amount of data transfer involved with the download of the purchased digital object and/or an analysis of the network resources associated with the network operator system and/or merchant website operator system, determine whether the download of the purchased digital object should be delayed and/or whether the subscriber should be provided an option for the download to be delayed.

In response to a determination that the download of the purchased digital object should be delayed, the transaction processing module may generate a graphical user interface (e.g., pop-up window) with delay options associated with the download of the purchased digital object and/or incentives offered to the subscriber in exchange for agreeing to accept the delayed download of the purchased digital object. In one implementation, the delay options and the incentives associated therewith may be selectable by the subscriber. According to an aspect of this disclosure, the delay options may include one or more alternate later times for the download of the purchased digital object, available time windows when the download may occur, and/or other delay options.

According to an aspect of this disclosure, the delay options and/or the incentives may be dynamically generated based on the amount of data transfer involved with the download of the digital object and/or the analysis of the network resources associated with the network operator system and/or merchant website operator system.

According to an aspect of this disclosure, in response to a determination that the purchased digital object should be delayed, and/or receipt of delay option/incentives selections from the subscriber via the graphical user interface, the transaction processing module may further send a message to a delivery manager of the merchant website operator system indicating that the download of the purchased digital object is to be delayed. The message may include information regarding payment authorization for the purchase of the digital object, the delay options/incentives selected by the subscriber, and/or other information.

The delivery manager may accordingly manage the delivery of the purchased digital object to the subscriber device at the selected delayed time and/or time period without requiring further subscriber interaction or payment authorization. In other words, the subscriber may not be required to re-submit payment information (for example, credit card information and/or other information) to the transaction processing module because the payment authorization information is maintained at the merchant website operator system to indicate that the download of the purchased digital object at the delayed time and/or time period is authorized.

According to an aspect of this disclosure, the delivery manager may manage the delivery of the purchased digital object to the download management module of the network operator system along with delivery instructions indicating the selected delay options so that the download management module may manage the delivery of the purchased digital object to the subscriber device at the selected delayed time and/or time period. The delivery instructions may further include the payment authorization information that indicates that the download of the purchased digital object at the delayed time and/or time period is authorized. The download management module may direct the storage of the purchased digital object to the digital object store, and automatically download the purchased digital object to the subscriber device at the selected delayed time and/or time period.

According to an aspect of this disclosure, the delivery manager may manage the delivery of the purchased digital object to the download management module of the network operator system for storage in the digital object store. Thereafter, at the selected delayed time and/or time period, the delivery manager may send delivery instructions to the download management module to initiate the download of the digital object at the delayed time and/or time period.

According to one aspect, a method of this disclosure may include, but not be limited to, determining whether a transaction requires a download of a digital object, determining an amount of data transfer involved with the download of the digital object, analyzing the network resources associated with the network operator system and/or the merchant website operator system, determining whether the download of the digital object should be delayed, generating the graphical user interface with the delay options and/or rewards, managing the delayed delivery of the digital object, and/or performing other operations.

According to one implementation, a determination may be made regarding whether a transaction requires a download of a digital object to a subscriber device. For example, if the transaction comprises a purchase transaction between a subscriber and a merchant website including a purchase of a digital object, a determination may be made that the transaction does require the download of the digital object. If the transaction comprises a purchase transaction between a subscriber and a merchant website including a purchase of a service that generates a digital object (e.g., reports, spreadsheets, graphs, and/or other digital objects) that is to be downloaded to the subscriber, a determination may be made that the transaction does require the download of the digital object.

In response to a determination that a transaction does require the download of the digital object, a determination may be made regarding an amount of data transfer involved with the download of the digital object. In particular, a determination may be made regarding whether the amount of data transfer involved with the download of the digital object exceeds a pre-determined threshold. The pre-determined threshold may be a function of general network capability and may be defined in terms of various network criteria, for example, network speed, current network traffic/load conditions, anticipated load based on historical data, and/or other network criteria. According to one implementation, the determination may be made based on the size of the data files associated with the digital objects that may be detected from within HTML code of a relevant web page or through other embedded characteristics of the data source. According to one implementation, the determination may be made based on pre-stored information regarding URLs and/or sets of URLs that have a propensity to involve large data transfers. The pre-stored information may be stored in the database associated with the network operator system and/or merchant website operator system.

In response to a determination that the amount of data transfer involved with the download of the digital object exceeds the pre-determined threshold, the network resources associated with the network operator system and/or the merchant website operator system may be analyzed. The analysis of the network resources associated with the network operator system may include analysis of bandwidth availability for the download of the digital object, analysis of current network traffic, analysis of anticipated network traffic based on historical information, and/or analysis of other network parameters. The analysis of the network resources associated with the merchant website operator system may include current processing load of a merchant system processor, and/or analysis of other parameters.

According to one implementation, a determination is made regarding whether the download of the digital object should be delayed. The determination may be based on the amount of data transfer involved with the download of the digital object and/or the analysis of the network resources. For example, the analysis may indicate that the network operator system does not have sufficient bandwidth to perform the download of the digital object. In this case a determination may be made that the download of the digital object should be delayed. In some cases, the URL being utilized for the download may be compared with the pre-stored information regarding URLs. If a match is found, it may be determined that the URL being utilized for the download has a propensity to involve large data transfers and that the download of the digital object should be delayed. According to one implementation, the pre-stored information may include an indication regarding whether a delayed download feature is to be applied to downloads associated with a particular URL. For example, for some URL's it may be indicated that the delayed download feature is not to be applied (i.e., the URL's may be blocked). If it is indicated that the delayed download feature is to be applied and/or that the download would involve large bandwidth, a determination may be made that the download of the digital object should be delayed.

According to one implementation, the determination regarding whether the download of the digital object should be delayed may be based on subscriber service levels/packages. For example, such a feature may be made available to premier subscribers, or to subscribers with lower service levels and less bandwidth availability so that they could more effectively manage their downloads.

According to one implementation, in response to a determination that the download of the digital object should be delayed, a graphical user interface (GUI) (e.g., pop-up window) may be generated. The generated GUI may include options associated with the download of the purchased digital object and/or incentives offered to the subscriber for agreeing to accept the delayed download of the purchased digital object.

In one implementation, the graphical user interface, the delay options, and/or the incentives may be partially or fully configurable by the subscriber. In one implementation, the delay options and/or incentives may be obtained from a subscriber profile stored in the subscriber profile database. For example, the subscriber profile may include times (and/or time periods) of day that the subscriber is willing to accept a delayed download, a number of hours of delay that a subscriber is willing to accept for the download, types of incentives that the subscriber is interested in receiving for the delayed download, and/or other options/incentives.

In one implementation, the subscriber database may store a subscriber's option to not have the graphical user interface displayed, thereby manifesting an intent that the subscriber is not interested in delaying any downloads, and is thus not interested in receiving the associated reward(s).

In one implementation, the subscriber database may store a subscriber's one-click option for the delayed download. In other implementations, additional information, for example, terms of offer, may be provided to the subscriber.

In one implementation, the delay options and/or the incentives may be dynamically generated based on the amount of data transfer involved with the download of the digital object and/or the analysis of the network resources associated with the network operator system and/or merchant website operator system. For example, if the analysis of the network resources indicates that the download of the digital object may have to be delayed for a long period of time (e.g., more than 10 hours), the delay options may be generated indicating the first available download time as 10 hours ahead of the current time and the incentives associated with the long delay may be greater/higher than the rewards associated with a relatively small delay in the download.

Various other objects, features, and advantages of this disclosure will be apparent through the detailed description of the preferred embodiments and the drawings attached hereto. It is also to be understood that both the foregoing general description and the following detailed description are exemplary and not restrictive of the scope of this disclosure.

BRIEF DESCRIPTION OF THE DRAWINGS

FIG. 2 is a flowchart depicting an exemplary method for managing delayed downloading and/or streaming of digital objects, according to an aspect of this disclosure.

FIG. 3 is an exemplary graphical user interface presented to a subscriber, according to an aspect of this disclosure.

DETAILED DESCRIPTION

Figure 1:
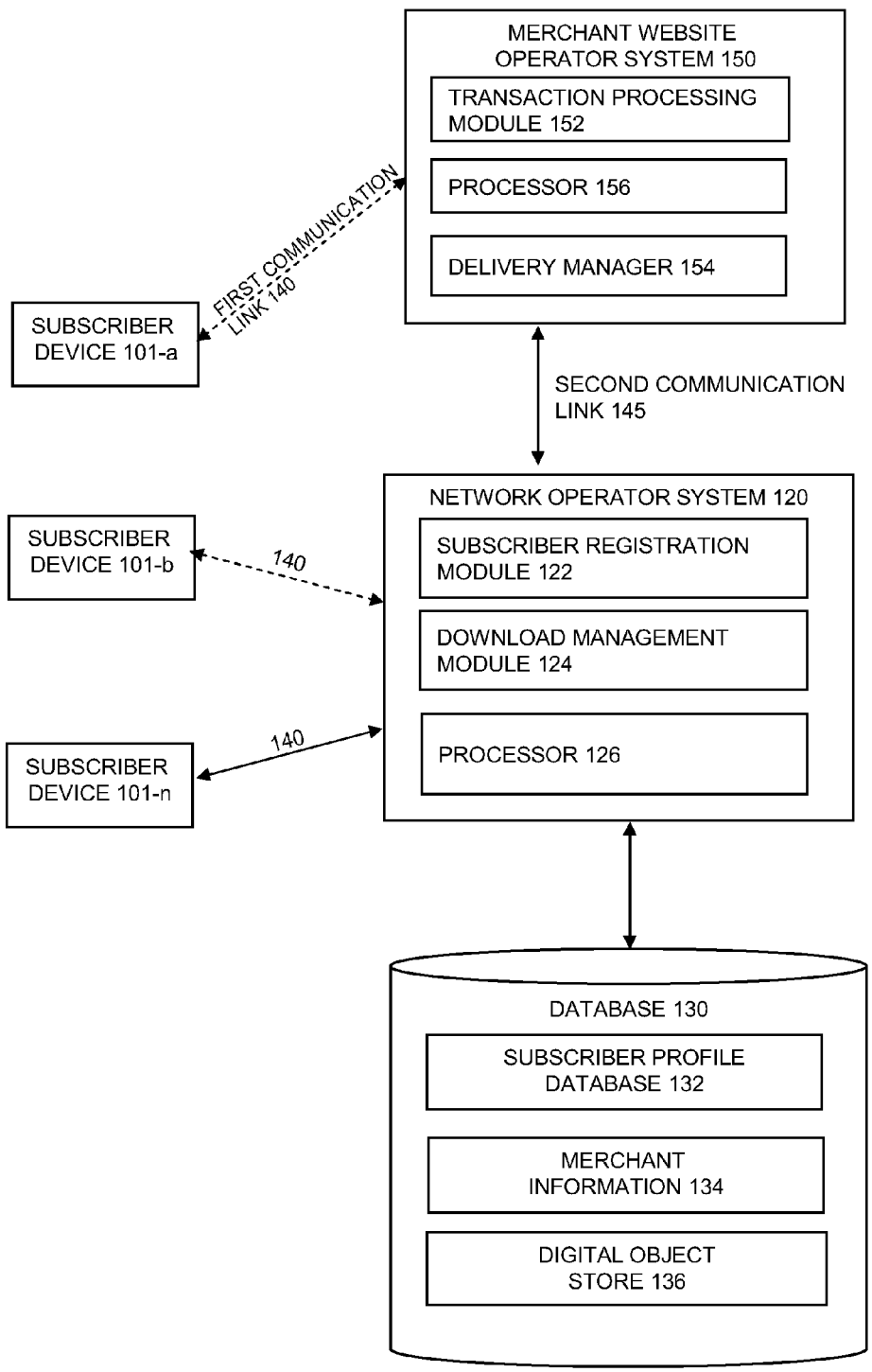
FIG. 1 is an illustration of exemplary system for managing delayed downloading and/or streaming of digital objects, according to an aspect of this disclosure.

FIG. 1 is an illustration of an exemplary system for managing delayed downloading and/or streaming of digital objects, according to an aspect of this disclosure. System 100 may include, among other components, one or more subscriber devices 101-a, 101-b, . . . 101-n (hereinafter referred to as subscriber device(s) 101 for convenience), a network operator system 120, and a merchant web site operator system 150 in operative communication with the network operator system 120. One or more subscribers may use subscriber device(s) 101 to connect to network operator system 120 and/or merchant website operator system 150. Subscriber devices 101 may connect to network operator system 120 and/or merchant website operator system 150 via a first communication link. The first communication link may comprise radio, wireless, IP, and/or other links. Merchant website operator system 150 may be communicatively connected to network operator system 120 via a second communication link. The second communication link may be a dedicated link such as, for example, a T1 line, and/or other dedicated link. In one implementation, the second communication link may have a different (e.g., higher) data flow rate than the first communication link.

According to an aspect of this disclosure, the network operator system 120 may comprise computer hardware programmed with a computer application having various software modules including a subscriber registration module 122, a download management module 124 and/or other modules as described herein. The network operator system 120 may comprise a processor 126, circuitry and/or other hardware operable to execute computer-readable instructions. According to one aspect of this disclosure, merchant website operator system 120 may include one or more computer-readable storage media configured to store the various software modules, wherein the software modules include computer-readable instructions that, when executed by the processor, perform the functions described herein. The network operator system 120 may include or have access to a database 130 that comprises a subscriber profile database 132, a merchant information database 134, a digital object store 136, and/or other databases. While FIG. 1 depicts one network operator system 120, it should be understood that this disclosure is not limited to this implementation. According to various aspects of this disclosure, a plurality of network operator systems may be provided and associated with identifiers identifying the different network operator systems. Each of the network operator systems may comprise similar components/modules as described herein.

According to an aspect of this disclosure, the subscriber registration module 122 may manage the registration and/or access of one or more subscribers and/or subscriber device(s) 101 with/to the network operator system 120. The subscribers may register with the network operator system 120 by providing login/password information, personal information, subscriber device information, option information for delayed download/streaming, acceptable incentives information, subscriber preferences, and/or other information. Subscriber registration module 122 may create profiles for the subscribers based on the provided subscriber information. Subscriber registration module 122 may direct storage of the created subscriber profiles in subscriber profile database 132. According to one aspect of this disclosure, subscriber registration module 122 may also store a network operator system identifier of the network operator system with which a subscriber is registered in the subscriber profile/subscriber profile database 132. Subscriber registration module 122 may provide the network operator system identifier to the subscriber device 101 associated with the subscriber which may be used during one or more of the transaction processing operations described below.

According to an aspect of this disclosure, the option information for delayed download/streaming may include, but should not be limited to, whether a subscriber is interested in delaying any downloads, times (and/or time periods) of day that a subscriber is willing to accept a delayed download, a number of hours of delay that a subscriber is willing to accept for the download, whether the subscriber desires one-click option for the delayed download, whether the subscriber is interested in automatic delayed downloading, the time delay for which the subscriber is willing to accept automatic delayed downloading, the type of digital objects for which the subscriber is willing to accept a delayed download, the size of the digital objects for which the subscriber is willing to accept a delayed download and/or other option information. According to an aspect of this disclosure, acceptable incentives information may include, but should not be limited to, information regarding types of incentives that the subscriber is interested in receiving for the delayed download, the amount or value of incentives for which the subscriber is willing to accept automatic delayed downloading, and/or other incentive information. According to an aspect of this disclosure, the subscriber may be presented with a listing of the various available options/incentives associated with network operator system 120 to select from.

According to an aspect of this disclosure, the download management module 124 may receive, from the merchant website operator system 150, delayed download/delivery instructions for digital objects and/or services purchased by subscribers, authorization of payment for the digital objects and/or services, merchant website operator identifier information, and/or other merchant information. The download management module 124 may direct storage of the merchant information in the merchant information database 134.

The download management module 124 may also receive, from the merchant website operator system 150, electronic copies of the purchased digital objects to be delivered to the subscriber device(s) 101 based on the delayed download/delivery instructions. The download management module 124 may direct storage of the electronic copies in digital object store 136.

According to an aspect of this disclosure, the merchant website operator system 150 may be configured to host and/or operate a merchant website. The merchant website operator system 150 may comprise computer hardware programmed with a computer application with various software modules including a transaction processing module 152, a download/delivery manager 154 and/or other modules as described herein. The merchant web site operator system 150 may comprise a processor 156, circuitry and/or other hardware operable to execute computer-readable instructions. According to one aspect of this disclosure, merchant website operator system 150 may include one or more computer-readable storage media configured to store the various software modules, wherein the software modules include computer-readable instructions that, when executed by the processor, perform the functions described herein. While FIG. 1 depicts one merchant website operator system 150, it will be understood that this disclosure is not limited to this implementation. According to various aspects of this disclosure, a plurality of merchant website operator systems may be provided and associated with identifiers identifying the different merchant website operator systems. Each of the merchant website operator systems may comprise similar components/modules as described herein.

According to an aspect of this disclosure, transaction processing module 152 may perform various operations for purposes of executing a transaction (e.g., a secure online transaction) between a subscriber and the merchant website. The operations may include, but are not limited to, registration of a subscriber with the merchant website operator system 150, maintenance of subscriber accounts/profiles including information obtained from the subscriber during registration (such as personal information, login/password information, demographic information, credit card, debit card, or other payment information, subscriber preferences, option information for delayed download/streaming, acceptable incentives information, and/or other subscriber information), and/or information regarding transactions executed between the subscriber and the merchant website (such as confirmation details regarding a transaction, payment authorization information, and/or other information), receipt of transaction requests from a subscriber, generation of transaction identifiers to identify subscriber transaction requests, verification of subscriber and/or subscriber payment information, generation of an electronic receipt indicating confirmation of payment and executed transaction details, and/or other operations.

According to an aspect of this disclosure, the transaction may comprise the purchase of products and/or services including and/or requiring downloading/streaming of digital objects from the merchant website. For example, while browsing web pages describing offered products/services at the merchant website, a subscriber may find a product/service that the subscriber desires to purchase. The subscriber may initiate a transaction request to the merchant website for the purchase of the desired product/service. The transaction processing module 152 may receive the transaction request, and in response to receiving the transaction request, generate a transaction identifier identifying the transaction, register the subscriber with the merchant website operator system 150 (in the event that the subscriber is not already a registered subscriber), verify the payment information provided by the subscriber (by, for example, contacting a financial institution that can verify validity of the payment information), authorize payment for the product/service associated with the transaction, generate an electronic receipt for the executed transaction (the receipt including, but not limited to, details regarding the purchased product/service, the payment authorization, and/or other information), send the electronic receipt to the subscriber, and/or perform other operations.

According to an aspect of this disclosure, the transaction request may include the network operator system identifier that identifies the network operator system with which the subscriber is registered. The merchant website operator system 150 may use this identifier information to determine with which network operator system the subscriber who initiated the transaction request is registered. According to an aspect of this disclosure, transaction processing module 152 may send a request to each of the plurality network operator systems (not shown), the request including at least a portion of the subscriber information obtained from the subscriber, to determine with which network operator system the subscriber is registered. Each network operator system may compare the portion of the received subscriber information with the information stored in the subscriber profile database 132 to determine whether there is a match. In the event of a match, the network operator system that includes the match may send a response back to the merchant website operator system including the network operator system identifier that identifies the network operator system with which the subscriber is registered.

According to an aspect of this disclosure, the option information for delayed download/streaming may include, but is not limited to, whether a subscriber is interested in delaying downloads and/or whether the subscriber is interested in delaying the download of the purchased digital object, times (and/or time periods) of day that a subscriber is willing to accept a delayed download, a number of hours of delay that a subscriber is willing to accept for the download, whether the subscriber desires one-click option for the delayed download, whether the subscriber is interested in automatic delayed downloading, the time delay for which the subscriber is willing to accept automatic delayed downloading, the type of digital objects for which the subscriber is willing to accept a delayed download, the size of the digital objects for which the subscriber is willing to accept a delayed download, and/or other option information. According to an aspect of this disclosure, acceptable incentives information may include, but is not limited to, information regarding types of incentives that the subscriber is interested in receiving for a delayed download, the amount or value of incentives for which the subscriber is willing to accept automatic delayed downloading, and/or other incentive information. The option/incentive information may be provided by a subscriber during registration. In some instances, subscribers may desire to have an option of choosing delay options/incentives information on a per transaction and/or per purchased digital object basis. Transaction processing module 152 may prompt the subscribers to specify their delay options/incentives information for every transaction, for every purchased digital object, and/or for every purchased digital object in a transaction. According to an aspect of this disclosure, transaction processing module 152 may provide such prompts to the subscribers at any time during the execution of the transaction. According to an aspect of this disclosure, the subscriber may be presented with a listing of the various available options/incentives associated with merchant website operator system 150 and/or network operator system 120 to select from. According to an aspect of this disclosure, transaction processing module 152 may retrieve/obtain the option information from network operator system 120 that the subscriber is registered with.

According to an aspect of this disclosure, merchant website operator system 150 may include or have access to a database (not shown) that stores the various subscriber profile/options/incentives information associated with the subscribers, transaction information associated with the subscribers, and/or other information described above. Transaction processing module 152 may direct storage of this information in the database.

In response to a determination that a purchased product/service includes and/or requires a download of a digital object, transaction processing module 152 at the merchant website operator system 150 may automatically download the digital object to the subscriber device 101 associated with the subscriber in response to payment authorization for the product/service.

In various instances, download of a digital object may involve a large amount of data transfer and the network resources associated with the network operator system 120 and/or the merchant website operator system 150 may be too congested and/or overloaded to handle the download. In these instances, it may be beneficial to delay the download of the digital object to a later date/time to ensure efficient allocation of network resources by the network operator system 120 and/or merchant website operator system 150. In addition, a subscriber may also be willing to accept a delay in the download of the digital object to his or her subscriber device. In some instances, it may be determined that the download of the digital object is to be delayed based on current network traffic conditions. In other instances, the download may be delayed for network traffic planning/management purposes. For example, from a network planning perspective, high demand periods may be projected based on historical data and the download of the digital object may be delayed proactively to prevent any anticipated network congestion or other network problems.

According to an aspect of this disclosure, the transaction processing module 152 at the merchant website operator system 150 may perform purposefully delayed download processing operations (e.g., in addition to any inherent delays). The transaction processing module 152 may, based on a determination of an amount of data transfer involved with the download of a purchased digital object and/or an analysis of the network resources associated with the network operator system 120 and/or merchant website operator system 150, determine whether the download of the purchased digital object should be delayed and/or whether the subscriber should be given an option for the download to be delayed.

According to an aspect of this disclosure, transaction processing module 152 may determine that the download of the purchased digital object should be delayed in response to a determination that the amount of data transfer involved with the download of the digital object exceeds a pre-determined threshold. The pre-determined threshold may be a function of general network capability and may be defined in terms of various network criteria, for example, network speed, current network traffic/load conditions, anticipated load based on historical data, and/or other network criteria.

According to an aspect of this disclosure, the transaction processing module 152 may determine the amount of data transfer involved based on the size of data file(s) associated with the purchased digital object which may be detected from within HTML code of a relevant web page or through other embedded characteristics of the data source. According to an aspect of this disclosure, transaction processing module 152 may determine the amount of data transfer involved based on pre-stored information regarding URLs and/or sets of URLs that have a propensity to involve large data transfers. The pre-stored information may be stored in the database associated with the merchant website operator system 150.

According to an aspect of this disclosure, transaction processing module 152 may determine that the download of a purchased digital object should be delayed in response to a determination that the network resources associated with the network operator system 120 and/or merchant website operator system 150 are inadequate or insufficient to perform the download of the digital object. Transaction processing module 152 may analyze the network resources associated with the network operator system 120 and/or the merchant website operator system 150. The analysis of the network resources associated with the network operator system 120 may include analysis of bandwidth availability for the download of the digital object, analysis of current network traffic, analysis of anticipated network traffic based on historical information, and/or analysis of other network parameters. The analysis of the network resources associated with the merchant website operator system 150 may include current processing load of a merchant system processor, and/or analysis of other parameters.

In response to a determination that a download of a purchased digital object should be delayed, the transaction processing module 152 may generate a graphical user interface (e.g., pop-up window) with delay options associated with the download of the purchased digital object and/or incentives offered to the subscriber for agreeing to accept the delayed download of the purchased digital object. The delay options and the incentives associated therewith may be selectable by the subscriber. According to an aspect of this disclosure, the delay options may include alternate later times for download of a purchased digital object, available time windows when the download may occur, and/or other delay options. According to an aspect of this disclosure, the graphical user interface may provide the subscriber with an option to select the type of incentive that the subscriber is interested in receiving for agreeing to accept the delayed download.

According to an aspect of this disclosure, transaction processing module 152 may retrieve option information for delayed download/streaming, acceptable incentives information, and/or other option/incentive information from the database associated with the merchant website operator system 150 to determine whether the subscriber is interested in delaying downloads, which alternate times and/or available time windows for the delayed download should be offered to the subscriber, and/or which types of incentives should be offered to the subscriber for agreeing to the delayed download and/or other options/incentives. According to an aspect of this disclosure, transaction processing module 152 may request that network operator system 120 provide the option/incentive information from the subscriber profile database 132.

If retrieved option/incentive information indicates that a subscriber is interested in delaying downloads and/or delaying the download of the purchased digital object, transaction processing module 152 may generate the graphical user interface (e.g., pop-up window) with delay options and/or incentives determined based on the retrieved option/incentive information associated with the subscriber. In other words, the delay options and/or incentives included in the graphical user interface may comprise ones that the subscriber has indicated as acceptable and/or has expressed an interest in.

If retrieved option/incentive information indicates that the subscriber is not interested in delaying downloads and/or delaying the download of the purchased digital object and is therefore not interested in receiving the associated incentives, transaction processing module 152 may download the digital object to the subscriber device 101 associated with the subscriber without incurring a delay.

According to an aspect of this disclosure, transaction processing module 152 may retrieve the option/incentive information and determine whether the subscriber is interested in delaying downloads prior to performing the determination/analysis regarding the amount of data transfer involved with the download of the digital object and/or the network resources associated with the network operator system 120 and merchant website operator system 150. Thus, the subscriber's disinterest in the delaying of downloads may preclude the determination/analysis operations, thereby reducing the computational load on the processor associated with the merchant website operator system 150. In other words, the determination/analysis operations may be performed if the retrieved option/incentive information indicates that the subscriber is interested in the delaying the download of digital objects.

According to an aspect of this disclosure, the delay options and/or the incentives may be dynamically generated by transaction processing module 152 based on the amount of data transfer involved with the download of the purchased digital object and/or the analysis of the network resources associated with the network operator system 120 and/or merchant website operator system 150. The delay options may be adjusted in real-time based on amount of data transfer and/or the analysis of network resources. For example, if an analysis of the network resources indicates that the download of the digital object may have to delayed for a long period of time (e.g., more than 10 hours), the delay options may be generated indicating that the first available download time as 10 hours ahead of the current time. The incentives associated with the long delay may be greater/higher than the rewards associated with a relatively small delay in the download. According to one implementation, the amount or value of the incentives offered may be adjusted in real-time based on the analysis of network resources, the amount of data transfer, and/or the amount of delay the subscriber is willing to accept. For example, during periods of heavy network load/traffic, 50 loyalty points may be offered as an incentive for agreeing to delay the download by 2 hours, whereas 100 loyalty points may be offered as an incentive for agreeing to delay the download by 4 hours. Also, during periods of moderate network traffic a lower incentive may be offered as compared to during periods of heavy network traffic because a subscriber may have to incur a larger delay during periods of heavy network traffic.

In one implementation, if a subscriber is not interested in any of the system generated delay options and/or incentives, the subscriber may elect to have the transaction processing module 152 re-analyze the network resources and provide other delay options and/or incentives based on the analysis. In this case, the graphical user interface may include an option which allows the subscriber to make the election.

In one implementation, the dynamically generated delay options and/or incentives for a subscriber may be based on/selected based on the option/incentive information associated with the subscriber. In one implementation, the dynamically generated delay options and/or incentives may be selected from a database that includes a listing of the various available options/incentives associated with merchant website operator system 150 and/or network operator system 120.

According to an aspect of this disclosure, in response to a determination that a purchased digital object should be delayed (and/or to receipt of delay option/incentives selections from the subscriber via the graphical user interface), the transaction processing module 152 may transmit a message to a delivery manager 154 of the merchant website operator system 150 indicating that the download of the purchased digital object is to be delayed. The message may include information regarding payment authorization for the purchase of the digital object, the delay options and/or incentives selected by the subscriber, network operator system identifier information identifying the network operator system with which the subscriber is registered, and/or other information.

The delivery manager 154 may accordingly manage the delivery of the purchased digital object to the subscriber device 101 at the selected delayed time and/or time period without requiring further subscriber interaction or payment authorization. In other words, the subscriber may not be required to re-submit payment information to the transaction processing module 152 because payment authorization information is maintained at the merchant website operator system 150 indicating that the download of the purchased digital object at the delayed time and/or time period is authorized.

According to an aspect of this disclosure, at the selected delayed time and/or time period, transaction processing module 152 may re-analyze the network resources associated with the network operator system 120 and/or merchant website operator system 150 to determine if they are still inadequate or insufficient to perform the download of the purchased digital object. In response to a determination that the network resources are still inadequate or insufficient, a determination may be made that download of a digital object is to be further delayed. In response to a determination that download of a digital object should be further delayed, the transaction processing module 152 may generate another graphical user interface (e.g., pop-up window) with delay options associated with the download of the purchased digital object and/or incentives offered to the subscriber for agreeing to accept the delayed download of the purchased digital object. This time, however, incentives offered to the subscriber to accept the delayed download may be significantly higher than the first time. Transaction processing module 152 may then send an updated message to delivery manager 154 of the merchant website operator system 150 indicating the updated delay options and/or incentives selected by the subscriber, and/or other information.

According to an aspect of this disclosure, the delivery manager 154 may manage a delivery of a purchased digital object to the download management module 124 of the network operator system 120 along with delivery instructions indicating the selected delay options and/or incentives to enable the download management module 124 to manage the delivery of the purchased digital object to the subscriber device 101 at the selected delayed time and/or time period. The delivery instructions may further include the payment authorization information that indicates that the download of the purchased digital object at the delayed time and/or time period is authorized and/or merchant website operator system identifier information. The download management module 124 may direct the storage of the purchased digital object to the digital object store 136, and may automatically download the purchased digital object to the subscriber device 101 at the selected delayed time and/or time period. According to an aspect of this disclosure, delivery manager 154 may send updated delivery instructions to download management module 124 in the event that the selected time delay and/or time period has been updated.

According to an aspect of this disclosure, the delivery manager 154 may manage delivery of the purchased digital object to the download management module 124 of the network operator system 120 for storage in the digital object store 136. Thereafter, at the selected delayed time and/or time period, the delivery manager 154 may send delivery instructions to the download management module 124 to initiate the download of the digital object at the delayed time and/or time period. According to an aspect of this disclosure, the delivery manager 154 manages the delivery of the purchased digital object to the download management module 124 of the network operator system identified by the network operator system identifier. Delivery manager 154 may send updated delivery instructions to download management module 124 in the event that the selected time delay and/or time period has been updated.

According to an aspect of this disclosure, the download management module 124 of network operator system 120 may send a confirmation message back to the merchant website operator system 150 indicating that the delivery of the digital object has been successfully completed. The download management module 124 may send the confirmation message back to the merchant website operator system identified by the merchant website operator system identifier included in the delivery instructions and/or stored in the merchant information database 134. According to an aspect of this disclosure, the download management module 124 of network operator system 120 may perform operations necessary to ensure that the subscriber receives the incentives selected by the subscriber. In one aspect of this disclosure, both the merchant website operator system 150 and the network operator system 120 may each provide at least a portion of the incentives to the subscriber based on some agreed upon terms.

According to an aspect of this disclosure, network operator system 120 may comprise a transaction processing module (not shown) which may perform one or more of the operations performed by transaction processing module 152 of merchant website operator system 150 described herein. For example, network operator system 120 may perform the various determination, analysis, presentation, delivery, and/or other operations as described herein. Network operator system 120 may communicate with merchant website operator system 150 via the second communication link to transfer/receive any information that may be required to facilitate these operations.

For example, in one implementation, once a determination is made that a purchased product/service includes and/or requires a download of a digital object, merchant website operator system 150 may notify the transaction processing module of network operator system 120. Network operator system 120 may, based on a determination of an amount of data transfer involved with the download of the purchased object and/or analysis of the network resources associated with the network operator system 120 and/or merchant website operator system 150, determine whether the download of the purchased digital object should be delayed and/or whether the subscriber should be given an option for the download to be delayed. According to one implementation, network operator system 120 may notify the merchant website operator system 150 of the determination regarding delayed download, the determined delay options and/or incentives and/or other information. In one implementation, network operator system 120 may receive authorization of payment for the purchased digital object from merchant website operator system 150 and download management module 124 may manage the delayed download of the purchased digital object based on the determined delay options/incentives with or without delivery instructions from merchant website operator system.

In one implementation, the delay options and/or incentives to be provided to the subscriber may be determined by the network operator system 120, the merchant website operator system 150, or both. For example, network operator system 120 may determine which delay options/incentives are to be provided on a per subscriber basis, per merchant basis, and/or other criteria. A subscriber may select a subset of the different options/incentives that he/she is interested in and configure the system to present only those types of options/incentives. Subscribers may be grouped into different classes, for example, based on geographic location, service packages/levels, and/or other criteria. The delay options/incentives may be determined based on the classes. For example, subscribers in the east coast may get more/higher incentives than subscribers in the west coast because there is more traffic congestion in the east coast. Subscribers who have a higher dollar amount service package may get higher/lower incentives than those with lower dollar amount service package. The delay options/incentives provided may be based on the URL being utilized for the download. When the URL being used has a propensity to involve large data transfers, a longer time delay option and/or higher incentive may be provided.

In one implementation, network operator system 120 may have a pre-established agreement with merchant website operator 150 regarding the delayed download processing, delay options/incentives to be provided, the sharing of the rewards in terms of compensation, and/or other agreements.

FIG. 2 illustrates an exemplary flowchart 200 of processing operations, according to an aspect of this disclosure. The described operations may be accomplished using some or all of the system components described in detail above and, in some implementations, various operations may be performed in different sequences. In other implementations, additional operations may be performed along with some or all of the operations shown in FIG. 2. In yet other implementations, one or more operations may be omitted while others may be performed simultaneously. Accordingly, the operations describes are exemplary in nature and, as such, should not be viewed as limiting.

In an operation 202, a request to process a transaction may be received by a merchant website operator system (e.g., by transaction processing module 152).

According to one implementation, in an operation 204, a determination may be made regarding whether the transaction requires a download of a digital object to subscriber device 101 (e.g., by transaction processing module 152). For example, if the transaction comprises a purchase transaction between a subscriber and a merchant website including a purchase of a digital object, a determination may be made that the transaction does require download of a digital object. If the transaction comprises a purchase transaction between a subscriber and a merchant website including a purchase of a service that generates a digital object (e.g., reports, spreadsheets, graphs, and/or other digital objects) that is to be downloaded to the subscriber, a determination may be made that the transaction does require the download of the digital object.

In response to a determination that the transaction does require the download of the digital object, a further determination may be made (in an operation 206) regarding an amount of data transfer involved with the download of the digital object (e.g., by transaction processing module 152). In particular, a determination may be made regarding whether the amount of data transfer involved with the download of the digital object exceeds a pre-determined threshold.

In response to a determination that the transaction does not require the download of the digital object, regular transaction processing operations may be performed in an operation 220.

In response to a determination that the amount of data transfer involved with the download of the digital object exceeds the pre-determined threshold, the network resources associated with the network operator system 120 and/or the merchant website operator system 150 may be analyzed in an operation 208 (e.g., by transaction processing module 152). The analysis of the network resources associated with the network operator system 120 may include analysis of bandwidth availability for the download of the digital object, analysis of current network traffic, analysis of anticipated network traffic based on historical information, and/or analysis of other network parameters. The analysis of the network resources associated with the merchant website operator system 150 may include current processing load of a merchant system processor, and/or analysis of other parameters.

According to one implementation, a determination may be made (in an operation 210) regarding whether download of a digital object should be delayed (e.g., by transaction processing module 152). The determination may be based on the amount of data transfer involved with the download of the digital object and/or the analysis of the network resources. For example, the analysis may indicate that the network operator system 120 does not have sufficient bandwidth to perform the download of the digital object. In this event, a determination may be made that the download of the digital object should be delayed. Also, in response to a determination that the amount of data transfer involved with the download of the digital object exceeds a pre-determined threshold, a determination may be made that the download of the digital object should be delayed.

According to one implementation, in response to a determination that the download of the digital object should be delayed, delay options and/or incentives associated with the delayed download may be presented to the subscriber. For example, a graphical user interface (e.g., pop-up window) with delay options associated with the download of the purchased digital object and/or incentives offered to the subscriber (for agreeing to accept the delayed download of the purchased digital object), may be generated in an operation 212 (e.g., by transaction processing module 152).

In response to a determination that the download of the digital object should not be delayed, the transaction may be processed without the delayed download in an operation 230. In other words, in operation 230, the digital objects may be downloaded to the subscriber device 101 without delay.

According to one implementation, the delayed downloading of the digital object may be managed in an operation 214 (e.g., by transaction processing module 152, delivery manager 154, and/or download management module 124).

In instances, where the subscriber's option information indicates that the subscriber is willing to accept automatic delayed downloading, a determination may be made whether the delay options and/or incentives meet the subscriber's specifications for automatic delayed downloading specified in the option information (e.g., whether the incentive being offered is equal or greater to the amount/value for which the subscriber is willing to accept automatic delayed downloading, etc.). In response to a determination that the delay options and/or incentives meet the subscriber's specifications for automatic delayed downloading, the download of the digital object may be automatically delayed. In this case, for example, the pop-up window may not be presented to the subscriber. The subscriber may instead be presented with a message that indicates that the download has been delayed and may summarize the timing of the delayed downloads, status of incentives, and/or other information.

According to an aspect of this disclosure, the various operations may be performed by modules or components of merchant website operator system (e.g., transaction processing module 152, delivery manager 154, and/or other components), modules or components of network operator system (e.g., transaction processing module of network operator system, subscription registration module 122, download management module 124, and/or other components), or a combination of both.

FIG. 3 is an exemplary graphical user interface presented to a subscriber, according to an aspect of this disclosure. The graphical user interface 300 (e.g., pop-up window) may present delay options 310 associated with the download of the purchased digital object and/or incentives 315 offered to the subscriber for agreeing to accept the delayed download of the purchased digital object. Delay options 310 and the incentives 315 associated therewith may be selectable by the subscriber. According to an aspect of this disclosure, the delay options may include alternate later times for the download of the purchased digital object, available time windows when the download may occur, and/or other delay options from which a subscriber may select. For example, FIG. 3 depicts various delay options that a subscriber may select from along with the incentives associated therewith. For example, a subscriber may select delay option 3 thereby indicating that he is willing to accept a delay of 3 hours and receive 50 loyalty points for the selection. Depending on the time of day and/or delay that the subscriber is willing to accept, the subscriber may be provided with different loyalty points (for example, the longer/later the delay, the higher the loyalty points). For instance, the subscriber may receive 20 loyalty points if he/she is willing to accept a delay of 2 hours, 100 loyalty points for a delay of 4 hours, and so forth. Similarly, the subscriber may receive 100 loyalty points if he/she selects time period 2:00 AM-5:00 AM for the delayed download, 50 loyalty points if he/she selects time period 1:00 AM-4:00 AM for the delayed download, and so forth.

According to an aspect of this disclosure, the graphical user interface may provide the subscriber with an option 320 to select a type of incentive that the subscriber is interested in receiving for agreeing to accept the delayed download. As shown in FIG. 3, the subscriber has selected loyalty points as incentive type. Thus, the incentives associated with each of the delay options depict a number of loyalty points that the subscriber can receive for selecting the respective delay option. If the subscriber were to choose monetary compensation as the incentive type, the interface would display the various incentives 315 as dollar amounts. According to an aspect of this disclosure, at least one of the incentives from the one or more incentive types mentioned in the acceptable incentives information associated with the subscriber may be selected as a default incentive type and the graphical user interface may be generated using the default incentive type. According to one aspect of this disclosure, the incentive types included in the incentive type drop-down box 320 may include the one or more incentives types mentioned in the acceptable incentives information associated with the subscriber.

According to an aspect of this disclosure, delay options may also include options that are generated based on ones that the subscriber has indicated as acceptable and/or expressed an interest in (e.g., based on the delay options information in the subscriber profile database 132 and/or database associated with the merchant website operator system 150).

According to an aspect of this disclosure, the delay options and/or incentives may be dynamically generated by, for example, transaction processing module 152.

According to an aspect of this disclosure, while the various embodiments herein are described with respect to a purchase transaction (e.g., a transaction associated with purchase of products and/or services including and/or requiring downloading/streaming of digital objects from the merchant website), the disclosure is not limited to such transactions. For example, a transaction may comprise a request for a free product including and/or requiring downloading/streaming of digital objects from a merchant website, and the implementations described herein may be applied to processing of these transactions as well. It will be understood, however, that not all payment authorization/verification related operations may need to be performed.

According to an aspect of this disclosure, a transaction between a subscriber and a merchant website may require uploading of digital objects to the merchant website. However, there may be instances in which the upload of a digital object may involve a large amount of data transfer and the network resources associated with the network operator system 120 and/or the merchant website operator system 150 may be too congested and/or overloaded to handle the upload. In these instances, it may be beneficial to delay the upload of the digital object to a later date/time to ensure efficient allocation network resources by the network operator system 120 and/or merchant website operator system 150. In addition, the subscribers may also be willing to accept the delay in the upload of the digital object from their subscriber devices to the merchant website.

According to an aspect of this disclosure, the transaction processing module 152 at the merchant website operator system 150 may perform purposefully delayed upload processing operations (e.g., in addition to any inherent delays). The transaction processing module 152 may, based on a determination of an amount of data transfer involved with the upload of the digital object and/or an analysis of the network resources associated with the network operator system 120 and/or merchant website operator system 150, determine whether the upload of the digital object should be delayed and/or whether the subscriber should be given an option for the upload to be delayed. As such, the embodiments described herein may be applied to such transaction requiring upload of digital objects.

According to an aspect of this disclosure, various functions described herein may be implemented for machine to machine communications and data transfer. The delay options/incentives may be automatically determined by the system and/or be based on option settings provided by an administrator on any of the machines involved in the data transfer.

According to an aspect of this disclosure, the delayed download options/incentives may be provided by the network operator system as a service to the subscriber with or without the merchant website operator system knowing or in conjunction with the merchant website operator system.

Implementations of this disclosure may be made in hardware, firmware, software, or various combinations thereof. Embodiments of this disclosure may also be implemented as computer-readable instructions stored on a computer-readable storage medium which may be read and executed by one or more processors. A computer-readable storage medium may include various mechanisms for storing information in a form readable by a computing device. For example, a computer-readable storage medium may include read only memory, random access memory, magnetic disk storage media, optical storage media, flash memory devices, and/or other storage mediums. Further, firmware, software, routines, or instructions may be described in the above disclosure in terms of specific exemplary aspects and implementations of this disclosure, and performing certain actions. However, it will be apparent that such descriptions are merely for convenience, and that such actions may in fact result from computing devices, processors, controllers, or other devices executing firmware, software, routines or instructions.

Other aspects, uses and advantages of this disclosure will be apparent to those skilled in the art from consideration of the specification and practice of the inventive concept discussed and disclosed herein. The specification should be considered exemplary only, and the scope of the inventive concept is accordingly intended to be limited only by the following claims.

What is claimed is:

1. A computer-implemented method for managing a delayed downloading of a digital object, the method comprising a plurality of operations being performed by a processor, the plurality of operations comprising:
   determining whether an amount of data transfer involved with a download of the digital object exceeds a pre-determined threshold;
   in response to a determination that the amount of data transfer involved with the download of the digital object exceeds the pre-determined threshold, analyzing of one or more network resources associated with a network operator system;
   determining whether the download of the digital object should be delayed based on the amount of data transfer and the analysis of the network resources associated with the network operator system;
   in response to a determination that the download of the digital object should be delayed, determining whether the download of the digital object should be automatically delayed based on a delay option and an associated incentive that are acceptable to a user, wherein the delay option and the associated incentive are based at least on the analysis of the network resources; and
   if the delay option and the associated incentive are not acceptable to the user, receiving a user input to re-analyze the one or more network resources and provide another delay option and/or incentive based on the re-analysis.

2. The computer-implemented method of claim 1, wherein determining an amount of data transfer comprises:
   determining the amount of data transfer involved with the download of the digital object based on the size of the digital object.

3. The computer-implemented method of claim 1, further comprising:
   analyzing one or more resources associated with a merchant website operator system, wherein a determination of whether the download of the digital object should be delayed is based on the determined amount of data transfer, the analysis of the network resources associated with the network operator system, and the analysis of resources associated with the merchant website operator system.

4. The computer-implemented method of claim 1, further comprising dynamically generating the delay option and the associated incentive based on the determined amount of data transfer and the analysis of the network resources associated with the network operator system.

5. The computer-implemented method of claim 4, wherein the dynamic generation of the delay option and the associated incentive includes adjusting a time delay associated with the delay option and adjusting an amount or value associated with the associated incentive.

6. The computer-implemented method of claim 1, wherein the delay option and the associated incentive are configurable by a user.

7. The computer-implemented method of claim 1, wherein the analysis of the network resources associated with the network operator system includes at least one of: analysis of bandwidth availability for the download of the digital object, analysis of current network traffic, or analysis of anticipated network traffic based on historical information.

8. The computer-implemented method of claim 1, further comprising:
   in response to a determination that the digital object should be automatically delayed, delaying the download of the digital object without presenting the delay option and the associated incentive.

9. The computer-implemented method of claim 1, wherein the associated incentive comprises monetary compensation.

10. The computer-implemented method of claim 1, wherein the associated incentive a service credit.

11. The computer-implemented method of claim 1, wherein the associated incentive a billing credit.

12. The computer-implemented method of claim 1, wherein the associated incentive loyalty points associated with a loyalty program.

13. A computer-implemented system for managing a delayed downloading of a digital object comprising a non-transitory computer-readable storage medium, the non-transitory computer-readable storage medium comprising one or more computer-readable instructions which, when executed by a processor, cause the processor to:
   determine whether an amount of data transfer involved with a download of the digital object exceeds a pre-determined threshold;
   in response to a determination that the amount of data transfer involved with the download of the digital object exceeds the pre-determined threshold, analyze of one or more network resources associated with a network operator system;
   determine whether the download of the digital object should be delayed based on the amount of data transfer and the analysis of the network resources associated with the network operator system;
   in response to a determination that the download of the digital object should be delayed, determine whether the download of the digital object should be automatically delayed based on a delay option and an associated incentive that are acceptable to a user, wherein the delay option and the associated incentive are based at least on the analysis of the network resources; and if the delay option and the associated incentive are not acceptable to the user, receive a user input to re-analyze the one or more network resources and provide another delay option and/or incentive based on the re-analysis.

14. The computer-implemented system of claim 13, wherein the one or more computer-readable instructions causing the processor to determine an amount of data transfer further include instructions causing the processor to:
   determine the amount of data transfer involved with the download of the digital object based on the size of the digital object.

15. The computer-implemented system of claim 13, wherein the one or more computer-readable instructions further cause the processor to:
   analyze one or more resources associated with a merchant website operator system, wherein a determination of whether the download of the digital object should be delayed is based on the determined amount of data transfer, the analysis of the network resources associated with the network operator system, and the analysis of resources associated with the merchant website operator system.

16. The computer-implemented system of claim 13, wherein the one or more computer-readable instructions further cause the processor to:
   dynamically generate the delay option and the associated incentive based on the determined amount of data transfer and the analysis of the network resources associated with the network operator system.

17. The computer-implemented system of claim 16, wherein the dynamic generation of the delay option and the associated incentive includes one or more computer-readable instructions that further cause the processor to adjust a time delay associated with the delay option and adjust an amount or value associated with the associated incentive.

18. The computer-implemented system of claim 13, wherein the delay option and the associated incentive are configurable by a user.

19. The computer-implemented system of claim 13, wherein the analysis of the network resources associated with the network operator system includes at least one of:
   analysis of bandwidth availability for the download of the digital object, analysis of current network traffic, or analysis of anticipated network traffic based on historical information.

20. The computer-implemented system of claim 13, wherein the one or more computer-readable instructions further cause the processor to:
   in response to a determination that the digital object should be automatically delayed, automatically delay the download of the digital object without presenting the delay option and the associated incentive.

\* \* \* \* \*